United States Patent
Miura

(10) Patent No.: US 8,972,239 B2
(45) Date of Patent: Mar. 3, 2015

(54) SYNTAX ANALYSIS INFORMATION GENERATION APPARATUS, TRANSLATION APPARATUS, TRANSLATION SYSTEM, SYNTAX ANALYSIS INFORMATION GENERATING METHOD AND COMPUTER PROGRAM

(75) Inventor: Mitsugu Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 308 days.

(21) Appl. No.: 13/553,756

(22) Filed: Jul. 19, 2012

(65) Prior Publication Data

US 2013/0030791 A1 Jan. 31, 2013

(30) Foreign Application Priority Data

Jul. 25, 2011 (JP) .................................. 2011-162317

(51) Int. Cl.
*G06F 17/27* (2006.01)
*G06F 17/28* (2006.01)
(52) U.S. Cl.
CPC .......... *G06F 17/271* (2013.01); *G06F 17/2872* (2013.01)
USPC ............................................................ 704/4

(58) Field of Classification Search
USPC ............................................................ 704/4
See application file for complete search history.

(56) References Cited

U.S. PATENT DOCUMENTS 7,219,339 B1 * 5/2007 Goyal et al. .................. 717/143
8,712,759 B2 * 4/2014 Ylonen ............................ 704/9

FOREIGN PATENT DOCUMENTS

JP 62-040579 A 2/1987
JP 2006/350663 A 12/2006

* cited by examiner

*Primary Examiner* — Susan McFadden
(74) *Attorney, Agent, or Firm* — McGinn IP Law Group, PLLC

(57) ABSTRACT

A syntax analysis information generation apparatus includes an information generation unit. The information generation unit extracts grammatical information corresponding to a word candidate for an analysis target from first syntax analysis information (for example, syntax analysis information for translation) that represents grammatical constraint conditions, and generates second syntax analysis information (for example, syntax analysis information for character recognition) that represents the grammatical constraint conditions corresponding to the word candidate based on the extracted grammatical information.

9 Claims, 7 Drawing Sheets

Fig. 5

|    | $c_1$ | $c_2$ | $c_3$ | $c_4$ | $c_5$ | $c_6$ | $ | n | p | v | NP | PP | S |
|----|-------|-------|-------|-------|-------|-------|---|-----|-----|-----|-----|-----|-----|
| 0  | sh11  |       | sh10  | sh9   |       |       |   | sh1 |     |     | sh2 | sh3 | sh4 |
| 1  |       | sh13  |       | sh9   | sh12  |       |   | re5 | sh5 |     |     |     |     |
| 2  |       |       |       |       |       |       |   | sh5 | sh6 |     |     |     |     |
| 3  |       |       |       |       |       |       |   | sh1 |     | sh7 | sh2 | sh3 | sh8 |
| 4  |       |       |       |       |       |       | acc |   |     |     |     |     |     |
| 5  |       |       |       | sh12  |       |       |   | re4 | re4 |     |     |     |     |
| 6  |       | sh10  |       |       | sh14  |       |   | re3 |     | re3 |     |     |     |
| 7  |       |       |       |       |       | re2   |   |     |     |     |     |     |     |
| 8  |       |       |       |       |       | re1   |   |     |     |     |     |     |     |
| 9  |       |       |       | re9   |       |       |   |     |     |     |     |     |     |
| 10 |       |       | re8/sh15 |    |       |       |   |     |     |     |     |     |     |
| 11 |       | re6   |       |       |       |       |   |     |     |     |     |     |     |
| 12 |       |       |       |       | re11  |       |   |     |     |     |     |     |     |
| 13 |       |       | re7   |       |       |       |   |     |     |     |     |     |     |
| 14 |       |       |       |       |       | re12  |   |     |     |     |     |     |     |
| 15 |       |       |       | re10  |       |       |   |     |     |     |     |     |     |

|   | n | p | v | $ |
|---|---|---|---|---|
| n | 1 | 1 | 0 | 0 |
| p | 1 | 0 | 1 | 1 |
| v | 0 | 0 | 0 | 1 |

Fig. 7B

|   | $c_1$ | $c_2$ | $c_3$ | $c_4$ | $c_5$ | $c_6$ | $ |
|---|---|---|---|---|---|---|---|
| $c_1$ | 0 | 1 | 0 | 0 | 0 | 0 | 0 |
| $c_2$ | 0 | 0 | 1 | 0 | 0 | 0 | 0 |
| $c_3$ | 0 | 0 | 0 | 1 | 0 | 0 | 0 |
| $c_4$ | 0 | 0 | 0 | 0 | 1 | 0 | 0 |
| $c_5$ | 0 | 0 | 0 | 0 | 0 | 1 | 0 |
| $c_6$ | 0 | 0 | 0 | 0 | 0 | 0 | 1 |

SYNTAX ANALYSIS INFORMATION GENERATION APPARATUS, TRANSLATION APPARATUS, TRANSLATION SYSTEM, SYNTAX ANALYSIS INFORMATION GENERATING METHOD AND COMPUTER PROGRAM

This application is based upon and claims the benefit of priority form Japanese Patent Application No. 2011-162317, filed on Jul. 26, 2011, the disclosure of which is incorporated herein in its entirety by reference.

TECHNICAL FIELD

The present invention relates to a syntax analysis information generation apparatus, a translation apparatus, a translation system, a syntax analysis information used by syntax analysis.

BACKGROUND ART

Various configuration of a translation apparatus are proposed. One of the proposals is disclosed by patent document 1 (Japanese Patent Application Publication No. 1987-40579). The translation apparatus disclosed by this patent document 1 includes a means for capturing a character as an image, an OCR (Optical Character Reader) means for recognizing the character from the captured image and a means for translating its recognized character.

Patent document 2 (Japanese Patent Application Publication No. 2006-350663) discloses a configuration which performs syntax analysis for the characters recognized by an OCR process and, by this, detects the character recognition error of the OCR process. The configuration of this patent document 2 can raise the precision of the character recognition by the OCT process.

Problem to be Solved by the Invention

High grade precision of character recognition and translation is desired for an apparatus which is capable of performing both of the character recognition process and the translation process as shown by patent document 1. However, a problem occurs that a speed of the character recognition slows down when the syntax analysis, for example, disclosed by patent document 2 is performed in order to raise the precision of the character recognition.

SUMMARY

The present invention has been made in order to solve the above-mentioned problem. That is, the main object of the present invention is to provide a syntax analysis information generation apparatus, a translation apparatus, a translation system, a syntax analysis information generating method and a computer program which achieve improvement of the speed of the character recognition (reading) while achieving high grade precision of the character recognition (character reading) process and the translation process.

Means for Solving a Problem

A syntax analysis information generation apparatus of the present invention includes, an information generation unit which extracts grammatical information corresponding to a word candidate for an analysis target from first syntax analysis information that represents grammatical constraint conditions, and generates second syntax analysis information that represents the grammatical constraint conditions corresponding to the work candidate based on the extracted grammatical information.

A translation apparatus of the present invention includes, a syntax analysis information generation apparatus which is provided with a function to generate first syntax analysis information and second syntax analysis information, a character reading unit which reads a character from image data using a result of syntax analysis based on the second syntax analysis information generated by the syntax analysis information generation apparatus, and a translation unit which performs a translation process about the read character using a result of the syntax analysis based on the first syntax analysis information generated by the syntax analysis information generation apparatus.

A translation system of the present invention includes, a translation apparatus of the above-mentioned present invention, an image data output apparatus which outputs image data for the translation apparatus, and an output apparatus which outputs a translation result translated by the translation apparatus.

A syntax analysis information generating method of the present invention includes, extracting grammatical information corresponding to a word candidate for an analysis target from first syntax analysis information that represents grammatical constraint conditions, and generating second syntax analysis information that represents the grammatical constraint conditions corresponding to the word candidate based on the extracted grammatical information.

A non-transitory storage medium for storing a computer program of the present invention stores the computer program which causes a computer to execute, a process to extract grammatical information corresponding to a word candidate for an analysis target from first syntax analysis information that represents grammatical constraint conditions, and a process to generate second syntax analysis information that represents the grammatical constraint conditions corresponding to the word candidate based on the extracted grammatical information.

Further, the main object of the present invention is also achieved by a syntax analysis information generating method corresponding to the syntax analysis information generation apparatus of the present invention. Also, the main object of the present invention is achieved by a computer program which realizes the syntax analysis information generation apparatus of the present invention and the syntax analysis information generating method of the present invention by a computer.

Effect of the Invention

According to the present invention, improvement of the speed of the character recognition (reading) while achieving high grade precision of the character recognition (character reading) process and the translation process can be realized.

BRIEF DESCRIPTION OF THE DRAWINGS

Exemplary features and advantages of the present invention will become apparent from the following detailed description when taken with the accompanying drawings in which:

FIG. 5 is a figure showing an example of a syntax analysis table;

FIG. 6 is a figure showing an example of grammatical information;

FIG. 7A is a figure showing a different example of the grammatical information;

FIG. 7B is a figure showing another different example of the grammatical information;

EXEMPLARY EMBODIMENT

The exemplary embodiments according to the present invention will be described with reference to drawings below.
(First Exemplary Embodiment)

Figure 1A:
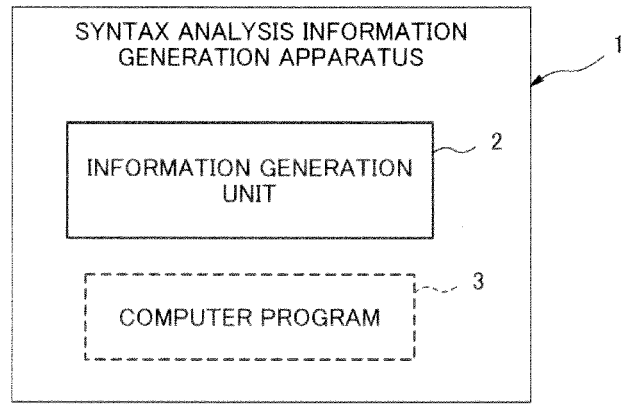
FIG. 1A is a block diagram illustrating a configuration of a syntax analysis information generation apparatus of a first exemplary embodiment according to the present invention.

FIG. 1A is a block diagram showing a configuration of a syntax analysis information generation apparatus of a first exemplary embodiment according to the present invention. The syntax analysis information generation apparatus 1 of this first exemplary embodiment includes an information generation unit 2. The information generation unit 2 has a function to extract grammatical information corresponding to a word candidate for an analysis target from first syntax analysis information that represent grammatical constraint conditions. Further, the information generation unit 2 has a function to generate second syntax analysis information that represents the grammatical constraint conditions corresponding to the word candidate based on the extracted grammatical information. For example, the syntax analysis information generation apparatus 1 includes a computer which performs control operation based on a computer program (hereinafter, it is also referred to as a program by abbreviating) 3. The computer program 3 includes a program which realizes the functions of the information generation unit 2 as mentioned above.

Figure 1B:
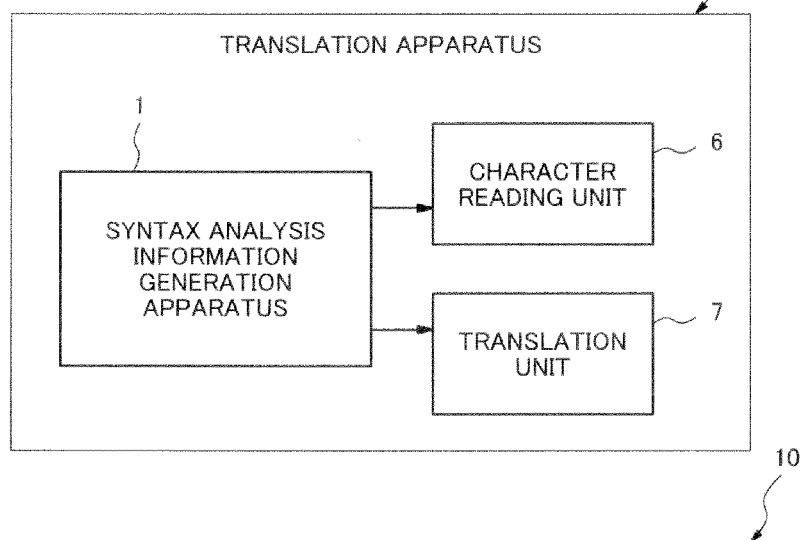
FIG. 1B is a block diagram illustrating a configuration of a translation apparatus of the first exemplary embodiment according to the present invention.

FIG. 1B is a block diagram showing an exemplary configuration of a translation apparatus equipped with a syntax analysis information generation apparatus 1. This translation apparatus 5 has a character reading unit 6 and a translation unit 7 in addition to the syntax analysis information generation apparatus 1. Here, the syntax analysis information generation apparatus 1 has a function to generate information on both of the first syntax analysis information and the second syntax analysis information.

The character reading unit 6 has a function to read a character from image data using a result of the syntax analysis based on the second syntax analysis information generated by the syntax analysis information generation apparatus 1. The translation unit 7 has a function to perform a translation process about the character read by the character reading unit 6. When the translation process is performed, the translation unit 7 uses a result of the syntax analysis based on the first syntax analysis information generated by the syntax analysis information generation apparatus 1.

According to this first exemplary embodiment, as mentioned above, the syntax analysis information generation apparatus 1 extracts the grammatical information corresponding to the word candidate for the analysis target from the first syntax analysis information and generates the second syntax analysis information based on the extracted grammatical information. In other words, the second syntax analysis information is a subset of the first syntax analysis information and is compact information simplified more than the first syntax analysis information.

The translation apparatus 5 has a function to read a character from image data using a result of the syntax analysis based on the second syntax analysis information. This translation apparatus 5 achieves to reduce the character errors, which misrecognizes a character when reading the character, by using the syntax analysis. Further, the second syntax analysis information used for the syntax analysis is the information which is more compact than the first syntax analysis information used by the translation process as described above. Even when the syntax analysis is performed using the second syntax analysis information which is more compact than the first syntax analysis information. The translation apparatus 5 can prevent the precision of the character recognition from being deteriorated, because it does not need complicated syntactic analyses like a case of performing translation for the syntactic analyses to be used in a case of reading a character.

Further, the processing speed of syntax analysis using the second syntax analysis information is faster than the processing speed of syntax analysis using the first syntax analysis information because the second syntax analysis information is more compact than the first syntax analysis information.

For the reason stated above, the configuration of this first exemplary embodiment can achieve improvement of the speed of the character recognition (reading) while achieving high grade precision of the character recognition (character reading) process and the translation process.

Figure 1C:
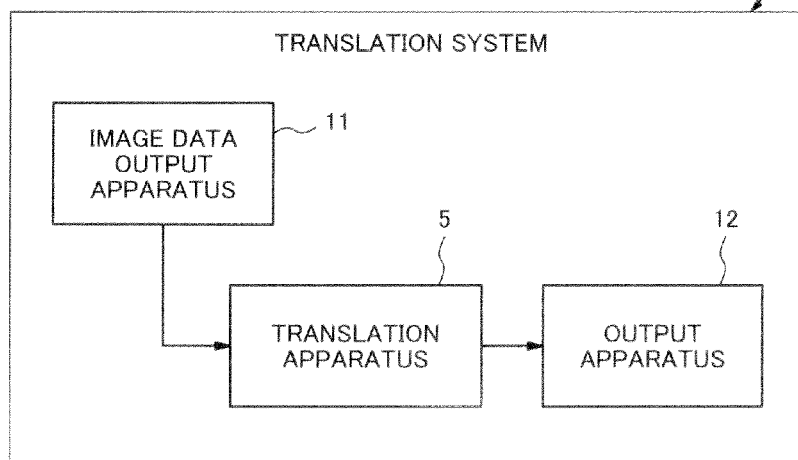
FIG. 1C is a block diagram illustrating a configuration of a translation system of the first exemplary embodiment according to the present invention.

It may configure a translation system 10 as shown in FIG. 1C as the translation apparatus 5 of this first exemplary embodiment. In other words, the translation system 10 includes the translation apparatus 5, an image data output apparatus 11 and an output apparatus 12. The image data output apparatus 11 has a function to output image data for the translation apparatus 5. Further, the output apparatus 12 has a function to output a translation result translated by the translation apparatus 5.

Because this translation system 10 is equipped with the translation apparatus 5, it can achieve improvement of the speed of the character recognition (reading) while achieving high grade precision of the character recognition (character reading) process and the translation process.
(Second Exemplary Embodiment)

The second exemplary embodiment according to the present invention will be described with reference to drawings below.

Figure 2:
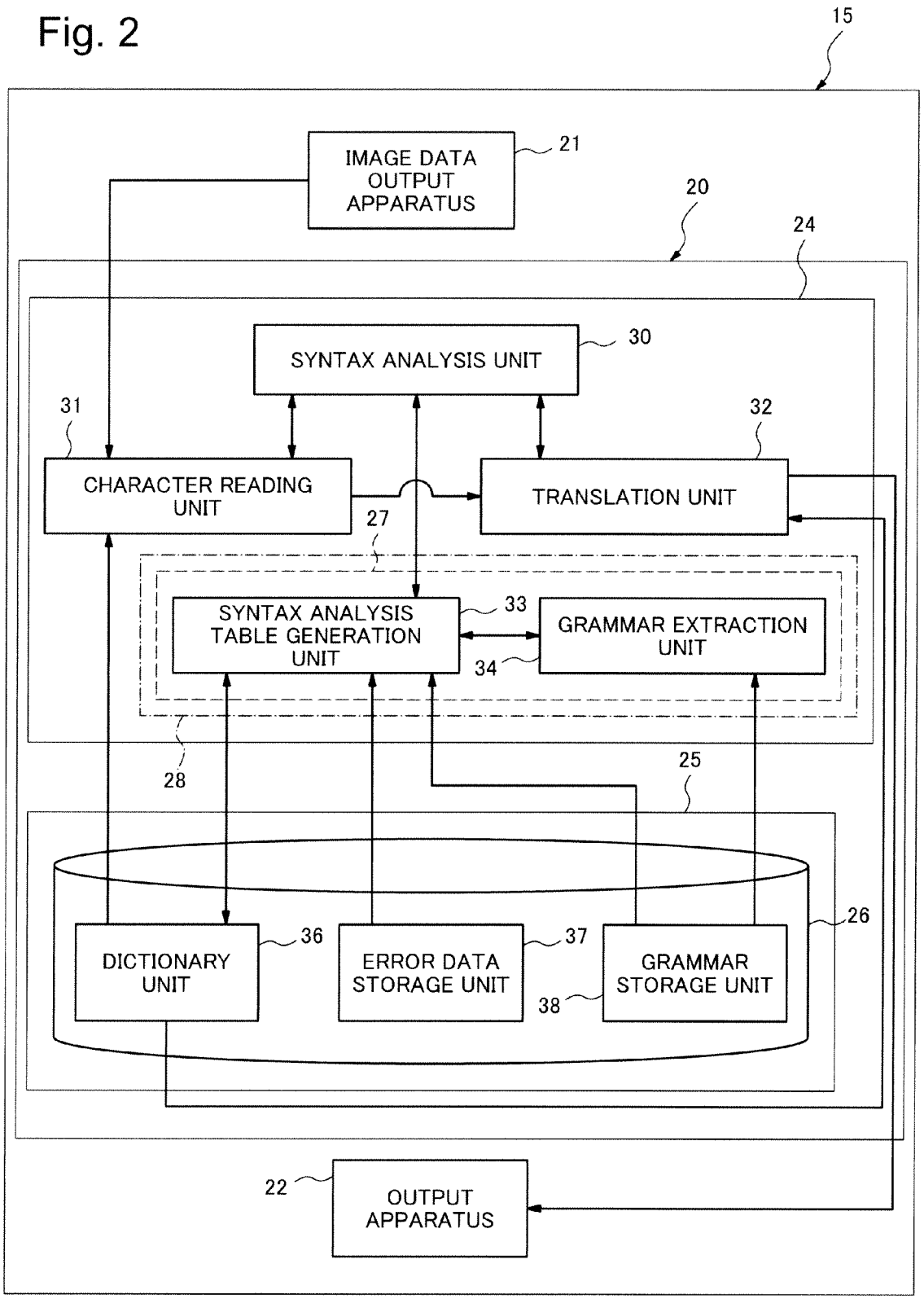
FIG. 2 is a block diagram which illustrates a configuration of a second exemplary embodiment according to the present invention in a simplified manner.

FIG. 2 is a block diagram showing a configuration of a translation apparatus of a second exemplary embodiment together with an image data output apparatus and an output apparatus. The translation apparatus 20 of this second exemplary embodiment includes a syntax analysis information generation apparatus as mentioned later. The translation apparatus 20 is connected to an image data output apparatus 21 and an output apparatus 22. Those translation apparatus 20, the image data output apparatus 21 and the output apparatus 22 compose a translation system 15.

The image data output apparatus 21 is an apparatus having a function to output image data and for example, is a personal computer. Or, the image data output apparatus 21 may be an apparatus which is equipped with the image scanner function that reads characters, pictures and photographs or the like indicated on a surface of a paper, and outputs the read information as digital data. The output apparatus 22 is an apparatus which processes information (data) outputted from the translation apparatus 20. Examples of the output apparatus 22 are cited, for example, such as a display, a printer, a communication apparatus and a voice synthesizer.

The translation apparatus 20 of this second exemplary embodiment includes a control apparatus 24 and a memory apparatus 25.

The memory apparatus 25 has a storage medium 26 storing various computer programs (programs) and data. For example, this storage medium 26 is a storage medium (non-transitory storage medium) such as a hard disk. According to this second exemplary embodiment, the storage medium 26 includes a storage area which functions as a dictionary unit 36, a storage area which functions as an error data storage unit 37 and a storage area which functions as a grammar storage unit 38 in addition to an area storing the programs. Further, a storage medium provided in the memory apparatus 25 may not only be a single element, but also be plural elements.

The dictionary unit 36 is a unit which can memorize word information. According to this second exemplary embodiment, the word information stored in the dictionary unit 36 includes over a plurality of kinds of language (for example, Japanese and English). When examples of the word information are given, for example, there are a word itself, grammatical attributes such as a part of speech and an inflectional form of the word, and a semantic attribute such as the meaning of the word. The word information in the dictionary unit 36 is used by the character recognition process and the translation process which will be described later.

The error data storage unit 37 is a unit which can memorize information on the character (hereinafter, also referred to as an error character) that is error-prone in recognition. As the error character (the error-prone character in recognition), for example, there are o (O), 0 (zero), l (el), | (vertical line), ol (O and el) and d (die). The information on such error characters (hereinafter, also referred to as an error data) is stored in the error data storage unit 37 in advance as initial information. Further, the translation apparatus 20 of this second exemplary embodiment may be equipped with the registration function of the error character. In other words, for example, when a user inputs information (an error data) on the error character to the translation apparatus 20 using an information input apparatus (not shown) such as s keyboard, the translation apparatus 20 registers (writes) the information on the inputted error character (and error data) to the error data storage unit 37.

The grammar storage unit 38 is a unit which can memorize grammatical information used by the translation process as mentioned later. According to this second exemplary embodiment, the grammatical information based on a GLR (Generalized LR (Left-Rightmost derivation)) parser using a context-free grammar (CFG) is stored in the grammar storage unit 38. Specifically, the grammar storage unit 38 stores replacement information on the characters based on the context-free grammar (CFG) as shown in FIG. 6, and information on a connection constraint between the parts of speech as shown in FIG. 7A and FIG. 7B. Further, the grammatical information shown in FIG. 6, FIG. 7A and FIG. 7B is one example, and the grammatical information stored in the grammar storage unit 38 is not limited to the shown example. Here, the detailed description of FIG. 6, FIG. 7A and FIG. 7B will be omitted. Further, the grammatical information stored in the grammar storage unit 38 is not limited to the grammatical information based on the GLR parser, and it may be grammatical information based on other grammar except the GLR parser, and it may be grammatical information based on other grammar except the GLR parser according to the grammar (for example, valence grammar and generative grammar) used by the character recognition process and the translation process.

The control apparatus 24 includes CPU (Central Processing Unit). The control apparatus 24 reads a program from the memory apparatus 25, and controls overall operation of the translation apparatus 20 by executing the program. That is, according to this second exemplary embodiment, by executing the program, the control apparatus 24 includes a syntax analysis unit 30, a character reading unit 31, a translation unit 32, a syntax analysis table generation unit 33 and a grammar extraction unit 34 as function blocks.

The character reading unit 31 is equipped with a function of so-called OCR (Optical Character Recognition). In other words, the character reading unit 31 has a function to recognize (extracting) the character from image data (digital data) outputted from the image data output apparatus 21. When a specific example is described, the character reading unit 31 determines a form of the character by connecting dots based on the received image data and the character dorm information given in advance. And, the character reading unit 31 relates the form of its determined character to relevant character information (recognizes a character).

Figure 3:
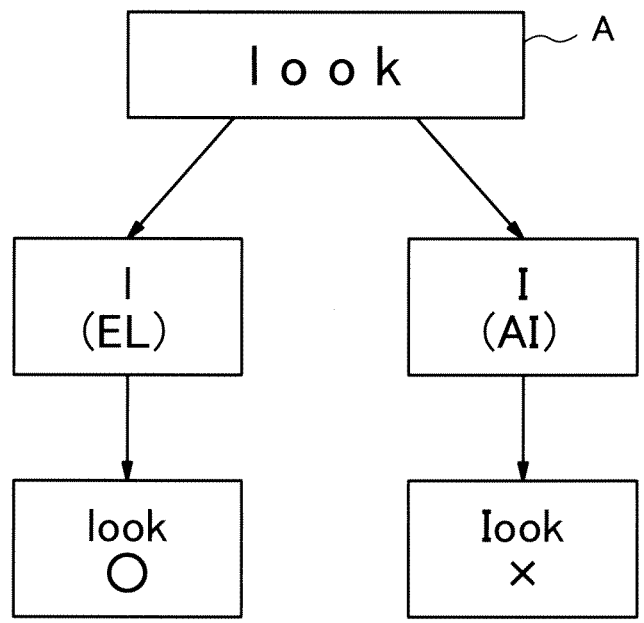
FIG. 3 is a figure illustrating one of methods of reading a character.

For example, it is supposed that the character reading unit 31 has determined the form of the character like A part shown in FIG. 3. In this case, because a character candidate relevant to the form of the character of "o" "o" "k" is one of each, the character reading unit 31 can recognize the character without a troublesome process with respect to "ook". In contrast, with respect to "l", there are a plurality of character candidates based on the information on the error data storage unit 37 such as "l (el)", "I (ai)", "| (vertical line)" and "1 (digit 1)". For this reason, the character reading unit 31 suitably selects one from those character candidates. For this selection, the character reading unit 31 uses the dictionary lookup method and the syntax analysis method. For example, when the dictionary lookup method is adapted, the character reading unit 31 assumes "l" in "look", which is recognized as one word, as "l (el)", and judges whether the word "l (el) ook" is registered in the dictionary unit 36. Thus, the character reading unit 31 judges whether the word including the character candidate is registered in the dictionary unit 36. And, the character reading unit 31 recognizes that "l" is "l (el)" based on a result of the judgment (there is a registration of "l (el) ook" in the dictionary unit 36, there is no registration of "I (ai) ook" in the dictionary unit 36).

Figure 4:
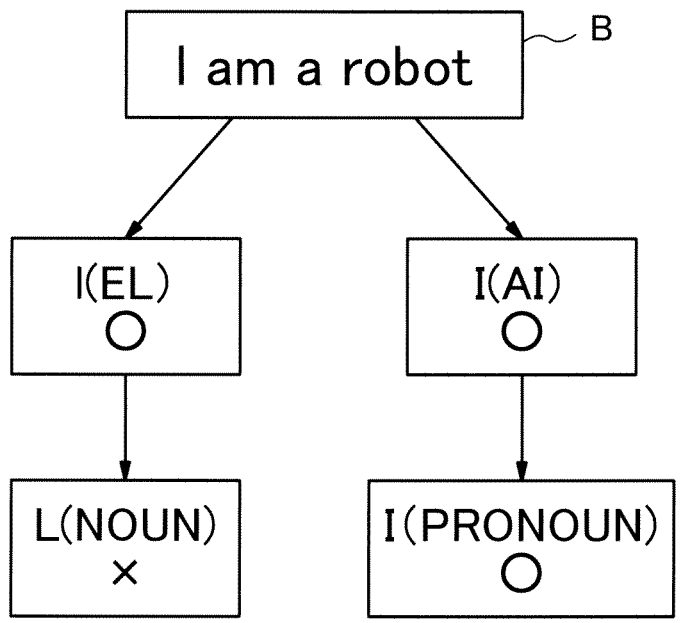
FIG. 4 is a figure illustrating a different method of reading a character.

When a different example is given, it is supposed, for example, that the character reading unit 31 has determined the form of the character like B part shown in FIG. 4. With respect to "l" in this case, as it is one word by one character, it cannot determine whether "l" is "l (el)" or "I (ai)" by the dictionary lookup method as mentioned above. For the reason, the character reading unit 31 outputs information on the form of the character determined as mentioned above to the syntax analysis unit 30. And, the character reading unit 31 recognizes that "l" is "I (ai)" based on a result of syntax analysis by the syntax analysis unit 32.

The character reading unit 31 includes a function to output information on sentences and words recognized as mentioned above to the translation unit 32.

The syntax analysis unit 30 has a function to perform syntax analysis about the character form received from the character reading unit 31. According to this second exemplary embodiment, the syntax analysis performed by the syntax analysis unit 30 is performed based on the extended LR grammar (a GLR parser). That is, the syntax analysis unit 30 performs the syntax analysis using a syntax analysis table (connection table (LR (Left-Rightmost derivation) table)) as shown in FIG. 5 which is provided by the syntax analysis table generation unit 33 mentioned later. Further, the syntax analysis table shown in FIG. 5 is an example, and the syntax analysis table to be used by the syntax analysis unit 30 is not limited to the syntax analysis table of FIG. 5. Here, the description of FIG. 5 and the description of syntax analysis by the GLR parser will be omitted.

The syntax analysis table generation unit 33 has a function to generate the syntax analysis table used by the syntax analysis unit 30. That is, according to this second exemplary embodiment, the syntax analysis table generation unit 33 receives information on the character form of an analysis target from the syntax analysis unit 30, and generates the syntax analysis table (first syntax analysis information) based on the GLR parser using the information and grammatical information stored in the grammar storage unit 38. In other words, by using the grammatical information in the grammar storage unit 38, the syntax analysis table generation unit 33 generates the syntax analysis table for translation used for the translation process.

On the other hand, the syntax analysis table generation unit 33 judges whether the character form corresponding to an error character exists in the information on the character form of the above-mentioned analysis target with referring to an error data stored in the error data storage unit 37. And, when there is the character form corresponding to the error character, the syntax analysis table generation unit 33 generates a plurality of word candidates from the character form of the analysis target taking the error character into account. Further, the syntax analysis table generation unit 33 compares each of those word candidates with respective words registered in the dictionary unit 36, and when there is a word which coincides with the word candidate, extracts the word. Further, the syntax analysis table generation unit 33 also extracts information on a part of speech of the extracted word from the dictionary unit 36. And, the syntax analysis table generation unit 33 outputs the information on the part of speech of the extracted word to the grammar extraction unit 34 mentioned later. Further, the syntax analysis table generation unit 33 extracts information corresponding to the grammatical information received from the grammar extraction unit 34 from the syntax analysis table for translation which has been generated as mentioned above, and generates (creates) the syntax analysis table (second syntax analysis information) which is more compact than the syntax analysis table for translation. In other words, the syntax analysis table generation unit 33 generates the syntax analysis table for character recognition which is a subset in the syntax analysis table for translation.

And, the syntax analysis table generation unit 33 verifies the syntax analysis table for character recognition. As a result of this verification, the syntax analysis table generation unit 33 outputs the proper syntax analysis table with error-free information about grammar to the syntax analysis unit 30.

The syntax analysis unit 30 performs syntax analysis based on the syntax analysis table as described above.

The grammar extraction unit 34 has a function to extract the grammatical information, which is corresponding to the information on parts of speech provided from the syntax analysis table generation unit 33, from the grammar storage unit 38, and to output the extracted grammatical information to the syntax analysis table generation unit 33.

According to this second exemplary embodiment, the information generation unit 27 that generates the syntax analysis tables (first and second syntax analysis information) for translation and for character recognition is constituted by the syntax analysis table generation unit 33 and the grammar extraction unit 34. Further, the information generation unit 27 composes the syntax analysis information generation apparatus 28.

The translation unit 32 has a function to recognize a word and a sentence by the dictionary lookup method and syntax analysis or the like based on the character recognized in the character reading unit 31. According to this second exemplary embodiment, the translation unit 32 performs syntax analysis using the syntax analysis table for translation which the syntax analysis table generation unit 33 has generated. Further, the translation unit 32 has a function to convert (translate) the recognized word and sentence into a language (target language) of a translation target using the information registered in the dictionary unit 36.

Figure 8:
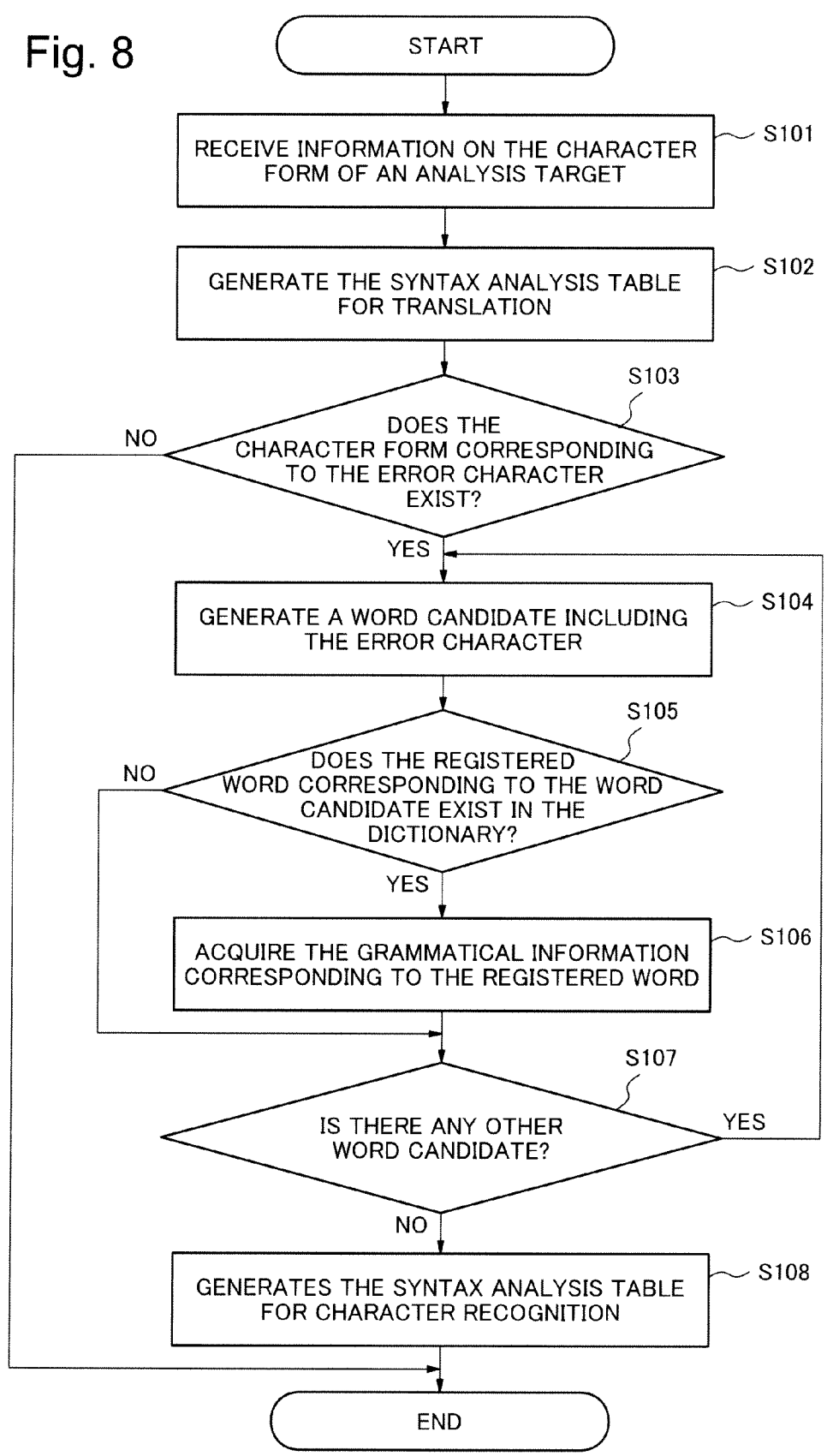
FIG. 8 is a flowchart showing an example of operation of a syntax analysis table generation unit in the second exemplary embodiment.

An example of generation operation of the syntax analysis table in the translation apparatus 20 will be described with reference to FIG. 8 below. In other words, FIG. 8 is a flowchart showing an example of operation to generate the syntax analysis table in the translation apparatus 20 of this second exemplary embodiment. This flowchart represents a processing procedure of a computer program executed by the control apparatus 24 in the translation apparatus 20.

For example, first, when the syntax analysis table generation unit 33 of the control apparatus 24 receives information on the character form of an analysis target from the syntax analysis unit 30 (Step S101), it generates the syntax analysis table for translation using the information concerned and the grammatical information of the grammar storage unit 38 (Step S102). Next, the syntax analysis table generation unit 33 judges whether the character form corresponding to the error character exists in the character form of the analysis target based on the error date of the error data storage unit 37 (Step S103). When judging that there is the character form corresponding to the error character (for example, a case where there is a character form that can be read as I (ai) and l (el)), the syntax analysis table generation unit 33 generates word candidates corresponding to the character form of the analysis target taking the error character into account. For example, the syntax analysis table generation unit 33 generates the word candidates such as "I (ai) ook" and "l (el) ook" (Step S104). And, the syntax analysis table generation unit 33 judges whether it is registered in the dictionary unit 36 about the generated word candidate (Step S105). When the word is registered, the syntax analysis table generation unit 33 reads the information on a part of speech corresponding to the registered word from the dictionary unit 36, and outputs to the grammar extraction unit 34. As a result, the grammar extraction unit 34 extracts the grammatical information according to the received information on the part of speech from the grammar storage unit 38 (Step S106).

After that, the syntax analysis table generation unit 33 judges whether there is another word candidate taking the error character into account (Step S107). When there is further another word candidate, the syntax analysis table generation unit 33 and the grammar extraction unit 34 repeat operation after Step S104. And, when judging that there is no other word candidate, as a result of the judgment operation of Step S107, the syntax analysis table generation unit 33 generates the syntax analysis table for character recognition based on the character form of the analysis target using the grammatical information extracted from the grammar storage unit 38 as mentioned above. That is, the syntax analysis table generation unit 33 generates the syntax analysis table which does not violate predetermined constraints (for example, connection constraints between the parts of speech) based on the grammatical information extracted as mentioned above (Step S108).

The translation apparatus 20 in this second exemplary embodiment includes the syntax analysis table generation apparatus 28 equipped with the information generation unit 27 which is composed of the syntax analysis table generation unit 33 and the grammar extraction unit 34 as mentioned above. As a result, the translation apparatus 20 has the following effect. That is, according to this second exemplary embodiment, the syntax analysis table generation unit 33 generates a plurality of syntax analysis tables of the syntax analysis table for translation and the syntax analysis table for character recognition. The translation apparatus 20 may have to analyze complicated sentences when the translation process is performed. In contrast, when performing the character recognition process to read a character from the character form of the analysis target, the translation apparatus 20 does not need to analyze complicated sentences. In other words, the syntax analysis table used for the character reading function can be simpler than the syntax analysis table used in case of translation. Considering about this, in this second exemplary embodiment, the syntax analysis table generation apparatus (the syntax analysis table generation unit 33) generates the syntax analysis table for translation and the syntax analysis table for character recognition which is a subset in the syntax analysis table for translation. In other words, the syntax analysis table generation apparatus 28 of this second exemplary embodiment generates the syntax analysis table specialized in the machine translation function and the syntax analysis table specialized in the character recognition function separately.

Accordingly, when the translation apparatus 20 performs the translation process, it improves the precision of translation by translating using the syntax analysis table specialized in translation. Also, when the translation apparatus 20 performs character reading, it performs the character reading (character recognition) using the syntax analysis table which is simpler than the syntax analysis table for translation and specialized in the character recognition process. As a result, the translation apparatus 20 can achieve reduction in processing time required for character reading. Further, because syntax analysis becomes simple by simplification in the syntax analysis table used in a case where character reading is performed, the translation apparatus 20 prevents the character reading accuracy caused by complication of syntax analysis from being deteriorated. As a result, the translation apparatus 20 improves the precision of character reading.

That is, the syntax analysis information generation apparatus 28 and the translation apparatus 20 equipped with thereof according to the second exemplary embodiment can realize the precision of character reading without deteriorating the precision of translation. The syntax analysis information generation apparatus 28 and the translation apparatus 20 equipped with thereof can realize reduction in processing time required for character reading.

(Other Exemplary Embodiment)

Further, this invention is not limited to the first and the second exemplary embodiments, but the various exemplary embodiments can be applied. For example, the information, which the translation apparatus 20 outputs to the output apparatus 22 in the second exemplary embodiment, may be a word or a sentence or the like after translation (a target language) translated by the translation unit 32. In addition to this, the information, which the translation apparatus 20 outputs to the output apparatus 22, may also further include information on a word or a sentence before translation which has been recognized by the character reading unit 31.

Further, the syntax analysis information generation apparatus 28 and the translation apparatus 20 in the second exemplary embodiment are realized by the control apparatus 24 which operates based on the computer programs (software). Instead of this, it also may realize a part or the whole functions configuring the syntax analysis information generation apparatus and the translation apparatus according to the present invention by hardware.

Figure 9:
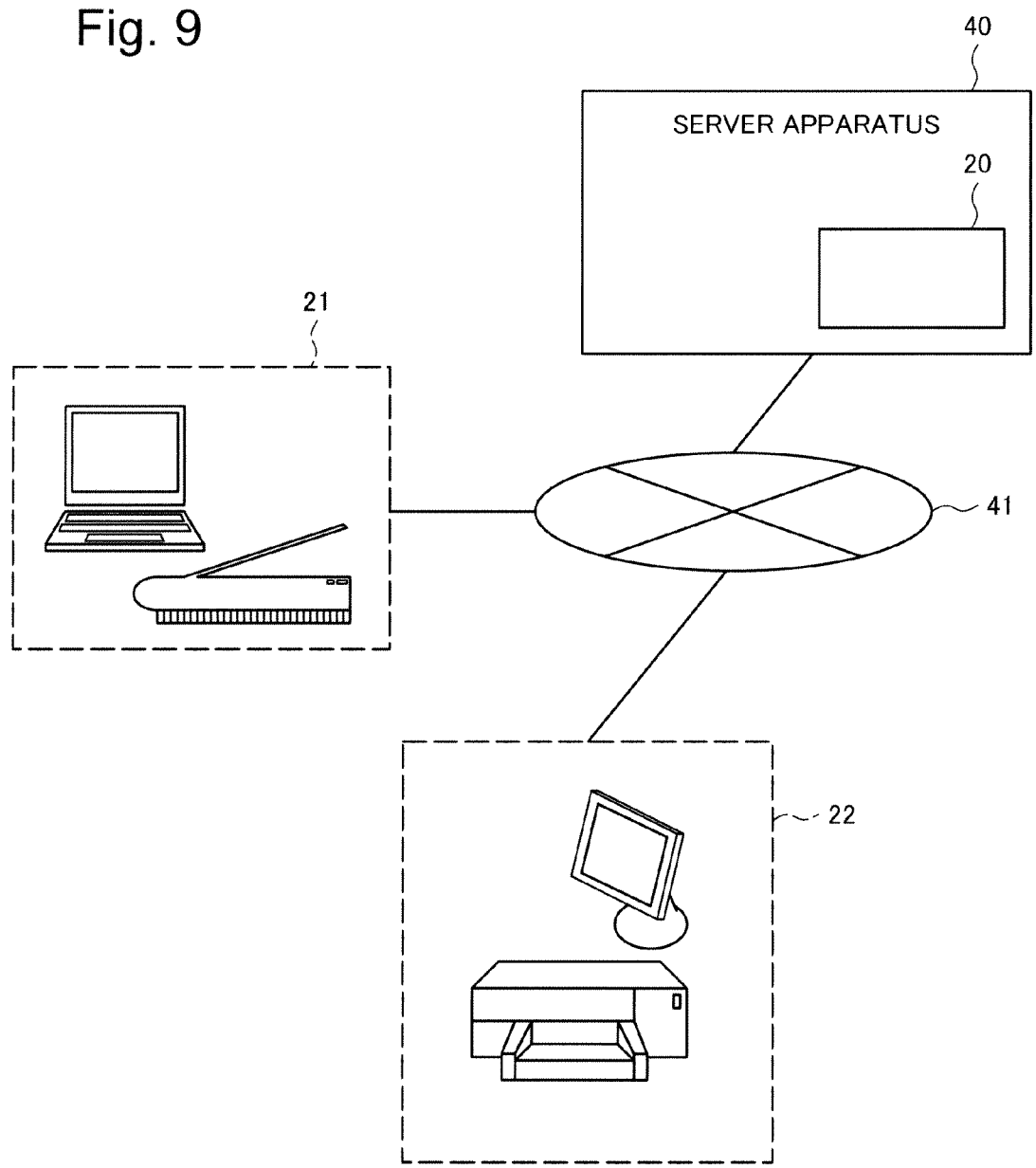
FIG. 9 is a block diagram which illustrates other exemplary embodiment according to the present invention in a simplified manner.

Further, the translation apparatus 20 in the second exemplary embodiment also may be included, for example, in a server 40 as shown in FIG. 9, and may configure translation system by connecting to the image data output apparatus 21 and the output apparatus 22 installed in a user side by an information network 41 such as the internet.

Further, the syntax analysis method in the second exemplary embodiment is the GLR parser. Instead of this, the syntax analysis method may be other techniques than the GLR parser as mentioned above. Further, the syntax analysis information is the form of a table (table) data according to the second exemplary embodiment, however, the syntax analysis information may be other data form than a table.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

[Description of the Codes]

1, 28 a syntax analysis information generation apparatus
2, 27 an information generation unit
5, 20 a translation apparatus
6, 31 a character reading unit
7, 32 a translation unit
10, 15 a translation system
11, 21 an image data output apparatus
12, 22 an output apparatus

The invention claimed is:

1. A syntax analysis information generation apparatus comprising:
    a processor on a computer; and
    a memory storing instructions;
        wherein said processor executes said instructions to function as an information generation unit which extracts grammatical information corresponding to a word candidate for an analysis target from first syntax analysis information that represents grammatical constraint conditions, and generates second syntax analysis information that represents the grammatical constraint conditions corresponding to the word candidate based on the extracted grammatical information.

2. The syntax analysis information generation apparatus according to claim 1, wherein the information generation unit extracts grammatical information corresponding to the word candidate from the first syntax analysis information based on a part-of-speech information of the word candidate.

3. The syntax analysis information generation apparatus according to claim 1, wherein the first syntax analysis information and the second syntax analysis information are syntax analysis information used by a syntax analysis algorithm based on a GLR (Generalized LR (Left-Rightmost derivation)) parser.

4. The syntax analysis information generation apparatus according to claim 1, wherein the information generation unit further includes a function to generate the first syntax analysis information based on the grammatical information corresponding to a translation process.

5. A translation apparatus comprising:
the syntax analysis information generation apparatus as set forth in claim 1;
a character reading unit which reads a character from an image data using a result of syntax analysis based on second syntax analysis information generated by the syntax analysis information generation apparatus; and
a translation unit which performs a translation process about the read character using a result of syntax analysis based on first syntax analysis information generated by the syntax analysis information generation apparatus.

6. An apparatus, comprising:
the translation apparatus as set forth in claim 5;
an image data output apparatus which outputs an image data for the translation apparatus; and
an output apparatus which outputs a translation result translated by the translation apparatus.

7. The translation apparatus according to claim 6, wherein the translation apparatus connects to the image data output apparatus and the output apparatus via an information network.

8. A syntax analysis information generating method comprising:
extracting, via a processor on a computer, grammatical information corresponding to a word candidate for an analysis target from first syntax analysis information that represents grammatical constraint conditions; and
generating second syntax analysis information that represents the grammatical constraint conditions corresponding to the word candidate based on the extracted grammatical information.

9. A non-transitory storage medium storing a computer program which causes a computer to execute:
a process to extract grammatical information corresponding to a word candidate for an analysis target from first syntax analysis information that represents grammatical constraint conditions; and
a process to generate second syntax analysis information that represents the grammatical constraint conditions corresponding to the word candidate based on the extracted grammatical information.

* * * * *